United States Patent
Ishizaki et al.

(10) Patent No.: US 11,814,493 B2
(45) Date of Patent: Nov. 14, 2023

(54) COATING COMPOSITION, EYEGLASS LENS, AND METHOD FOR MANUFACTURING EYEGLASS

(71) Applicant: HOYA LENS THAILAND LTD., Pathumthani (TH)

(72) Inventors: Takako Ishizaki, Shinjuku-ku (JP); Katsushi Hamakubo, Shinjuku-ku (JP); Natsumi Tasaki, Shinjuku-ku (JP)

(73) Assignee: HOYA LENS THAILAND LTD., Pathumthani (TH)

(*) Notice: Subject to any disclaimer, the term of this patent is extended or adjusted under 35 U.S.C. 154(b) by 976 days.

(21) Appl. No.: 16/583,384

(22) Filed: Sep. 26, 2019

(65) Prior Publication Data

US 2020/0017708 A1    Jan. 16, 2020

Related U.S. Application Data

(63) Continuation of application No. PCT/JP2019/014175, filed on Mar. 29, 2019.

(30) Foreign Application Priority Data

Mar. 29, 2018 (JP) ................................. 2018-066224

(51) Int. Cl.

| | | |
|---|---|---|
| *C08J 7/043* | (2020.01) | |
| *G02B 1/14* | (2015.01) | |
| *C09D 163/00* | (2006.01) | |
| *C09D 171/08* | (2006.01) | |
| *G02B 1/12* | (2006.01) | |
| *C08J 7/046* | (2020.01) | |
| *C08K 3/36* | (2006.01) | |
| *C08K 5/00* | (2006.01) | |
| *C08K 5/54* | (2006.01) | |
| *C08K 3/22* | (2006.01) | |

(52) U.S. Cl.
CPC .............. *C08J 7/043* (2020.01); *C08J 7/046* (2020.01); *C09D 163/00* (2013.01); *C09D 171/08* (2013.01); *G02B 1/12* (2013.01); *G02B 1/14* (2015.01); *C08K 3/36* (2013.01); *C08K 5/0025* (2013.01); *C08K 5/5403* (2013.01); *C08K 2003/2244* (2013.01)

(58) Field of Classification Search
None
See application file for complete search history.

(56) References Cited

U.S. PATENT DOCUMENTS

| | | | | |
|---|---|---|---|---|
| 5,116,644 A | * | 5/1992 | Asai ..................... | C09D 183/04 |
| | | | | 427/164 |
| 2005/0041298 A1 | * | 2/2005 | Toda ..................... | G02B 1/105 |
| | | | | 359/642 |
| 2017/0045646 A1 | * | 2/2017 | Sato ........................ | B05D 1/005 |
| 2017/0139084 A1 | | 5/2017 | Shimada | |

FOREIGN PATENT DOCUMENTS

| | | | | |
|---|---|---|---|---|
| CN | 106461814 A | | 2/2017 | |
| EP | 0383074 B1 | * | 4/1994 | ............... C09D 4/02 |
| JP | H03-229202 A | | 10/1991 | |
| JP | H08/311391 A | * | 11/1996 | ............... B32B 27/18 |
| JP | H08-311391 A | | 11/1996 | |
| JP | H10-147745 A | | 6/1998 | |
| JP | H10/286913 A | * | 10/1998 | ............... B32B 27/16 |
| JP | 2004-170500 A | | 6/2004 | |
| JP | 2005-343119 A | | 12/2005 | |
| JP | 2010-031090 A | | 2/2010 | |
| JP | 2015/217359 A | * | 12/2015 | ............... B01J 13/00 |
| JP | 2017/008306 A | * | 1/2017 | ............... B32B 27/16 |
| JP | 2018-002866 A | | 1/2018 | |

OTHER PUBLICATIONS

Kinoshita—JP H08-311391 A—IDS-MT-coating w-silica part+ organosilicon+polyfunctional epoxy+curing catalyst—1996 (Year: 1996).*
Takeshita—JP H10-286913 A—MT- coating w-4 epoxy groups—1998 (Year: 1998).*
Crivello—photo induced cationic polymerization—triarylsulfonium salts—Rad.Phys.Chem.—2002 (Year: 2002).*
Hirano—JP 2015-217359 A—MT-inorganic fine particle dispersion coating—2015 (Year: 2015).*
Inagaki—JP 2017-008306 A—MT-ray curable coating—2017 (Year: 2017).*
Millipore-Sigma—(3-Glycidyloxypropyl) trimethoxysilane—Jul. 19, 2022 (Year: 2022).*
Jun. 25, 2019 Search Report issued in International Patent Application No. PCT/JP2019/014175.

* cited by examiner

*Primary Examiner* — John Vincent Lawler
(74) *Attorney, Agent, or Firm* — Oliff PLC

(57) ABSTRACT

Provided are [1] a coating composition containing inorganic oxide particles (A), an epoxy compound (b1) having an organosilane moiety, a polyglycerol polyglycidyl ether (b2) having three or more epoxy groups, and a photocationic polymerization initiator (C), [2] a spectacle lens including a hard coat layer obtainable by curing the coating composition described in [1] above and a substrate, and [3] a method for producing a spectacle lens, including a step of applying the coating composition described in [1] above onto a substrate and a step of curing the applied coating composition by irradiation with light.

6 Claims, No Drawings

COATING COMPOSITION, EYEGLASS LENS, AND METHOD FOR MANUFACTURING EYEGLASS

TECHNICAL FIELD

The present disclosure relates to a coating composition, a spectacle lens including a coat layer obtained by curing a coating composition, and a method for producing a spectacle lens.

BACKGROUND ART

As compared with glass, plastic spectacle lenses are lightweight and have excellent impact resistance, but their surface hardness is insufficient. Therefore, the surface is covered with various hard coat layers to improve the scratch resistance.

Methods for curing a coating composition for the formation of a hard coat layer can be roughly divided into thermal curing and photocuring.

In thermal curing, a high scratch-resistance improving effect is obtained. However, the curing treatment time is long, and the pot life is short.

Meanwhile, in photocuring, the curing treatment time is short, and the productivity is high, but on the other hand, the scratch resistance tends to be inferior as compared with thermal curing. Particularly for the advantage of productivity, various photocurable coating compositions have been proposed. However, it is said that simultaneous achievement of abrasion resistance and adhesion to various substrates is difficult.

Patent Literature 1 relates to a method for producing a spectacle plastic lens covered with a photocurable hard coat film having excellent scratch resistance and adhesion, and describes a method in which a photocurable coating liquid containing (A) a compound having at least two (meth) acryloyl groups in the molecule, (B) an ionic photopolymerization initiator, and (C) metal oxide particles is applied to the surface of a plastic substrate, followed by radiation exposure to cause photocuring.

Patent Literature 2 relates to a coating composition for optical components, which is capable of forming a coat layer having scratch resistance and weather resistance and also cures within a short period of time, and describes a coating composition for optical components, containing a compound containing an epoxy group, a photocationic polymerization initiator, an organic solvent, and inorganic fine particles dispersed in the organic solvent.

CITATION LIST

Patent Literature

Patent Literature 1: JP 2005-343119 A
Patent Literature 2: JP 2010-031090 A

SUMMARY

Technical Problem

However, for the hard coat layers provided by the technologies of Patent Literatures 1 and 2 described above, further improvement is required in terms of scratch resistance.

Embodiments of the present disclosure relate to a coating composition capable of forming a hard coat layer having excellent scratch resistance, a spectacle lens having the hard coat layer, and a method for producing the spectacle lens.

Solution to Problem

Embodiments of the present disclosure relate to the following [1] to [3].

[1] A coating composition containing inorganic oxide particles (A), an epoxy compound (b1) having an organosilane moiety, a polyglycerol polyglycidyl ether (b2) having three or more epoxy groups, and a photocationic polymerization initiator (C).

[2] A spectacle lens including a hard coat layer obtainable by curing the coating composition described in [1] above and a substrate.

[3] A method for producing a spectacle lens, including:
a step of applying the coating composition described in [1] above onto a substrate; and
a step of curing the applied coating composition by irradiation with light.

Advantageous Effects

The embodiments of the present disclosure described above can provide a coating composition capable of forming a hard coat layer having excellent scratch resistance, a spectacle lens having the hard coat layer, and a method for producing the spectacle lens.

DESCRIPTION OF EMBODIMENT

[Coating Composition]

The coating composition according to an embodiment of the present disclosure contains inorganic oxide particles (A), an epoxy compound (b1) having an organosilane moiety (hereinafter sometimes referred to as "silane coupling agent (b1)"), a polyglycerol polyglycidyl ether (b2) having three or more epoxy groups, and a photocationic polymerization initiator (C).

Because the coating composition according to the above embodiment contains the above polyglycerol polyglycidyl ether (b2) in combination with other components, a hard coat layer having excellent scratch resistance can be formed.

The meanings of terms used herein will be described hereinafter.

The "solids content" in a coating composition means the amount of components other than a solvent.

The "number of carbon atoms" about a group having a substituent refers to the number of carbon atoms in moieties excluding the substituent.

<Inorganic Oxide Particles (A)>

Examples of inorganic oxide particles (A) include silica particles, titania particles, alumina particles, zirconia particles, iron oxide particles, antimony oxide particles, tin oxide particles, and tungsten oxide particles. Among them, in terms of obtaining even better scratch resistance, at least one kind selected from silica particles and zirconia particles is preferable, and silica particles are more preferable. They may be used alone, and it is also possible to use two or more kinds together.

Inorganic oxide particles may also be surface-treatedwith an organic treatment agent.

In terms of increasing the film hardness and suppressing the haze of the film itself, the average particle size of the inorganic oxide particles (A) may be 1 nm or more, 5 nm or more, and still 8 nm or more, and may be 100 nm or less, 50 nm or less, and 30 nm or less.

Here, the average particle size of inorganic oxide particles (A) is a value calculated from an adsorption isotherm using a nitrogen gas based on the specific surface area data using a BET (Brunauer-Emmett-Teller equation) multipoint method.

The inorganic oxide particles (A) may have a light transmittance of 50% or less at a wavelength of 660 nm in an affinity test for a dipentaerythritol acrylate compound.

The affinity test provides an index of affinity or compatibility for polyfunctional acrylates. When the light transmittance is 50% or less, this means that the inorganic oxide particles have low affinity for polyfunctional acrylates. However, according to the coating composition according to this embodiment, even when such inorganic oxide particles are used, excellent scratch resistance and a tackiness suppression effect are obtained.

In terms of obtaining even better scratch resistance, the light transmittance of the inorganic oxide particles (A) at a wavelength of 660 nm in an affinity test for a dipentaerythritol acrylate compound may be 45% or less, 40% or less, 30% or less, and 25% or less.

The affinity test for a dipentaerythritol acrylate compound is performed using a dipentaerythritol acrylate compound R-1 shown below, and is more specifically performed by the method described in the Examples.

The content of the inorganic oxide particles (A) relative to the solids content of the entire coating composition may be 10 mass % or more, 20 mass % or more, and 30 mass % or more, and may be 80 mass % or less, 70 mass % or less, 60 mass % or less, and 50 mass % or less.

As inorganic oxide particles, an inorganic oxide sol obtained by dispersing the inorganic oxide particles (A) in an organic solvent may be blended in the coating composition and used.

Examples of organic solvents used for an inorganic oxide sol include ether solvents, ester solvents, acetal solvents, and nonpolar solvents. Specific examples of organic solvents include propylene glycol methyl ether (hereinafter sometimes referred to as "PGM"), methyl ethyl ketone, and ethylene glycol mono-n-propyl ether.

Examples of commercially available products of inorganic oxide particles (A) include trade name "V-8804" manufactured by JGC Catalysts and Chemicals Ltd., and trade name "PGM-ST", "PGM-AC-2140Y", and "MEK-EC-2130Y" manufactured by Nissan Chemical Corporation.

Use of an inorganic oxide sol is effective in that inorganic oxide particles are dispersed in a colloidal state in the coating composition, and uneven distribution of inorganic oxide particles in a coating film is suppressed.

<Silane Coupling Agent (b1)>

The silane coupling agent (b1) is added for the purpose of curing the coating composition.

In order to obtain excellent scratch resistance, the silane coupling agent (b1) used for the coating composition has an organosilane moiety and an epoxy group. Incidentally, an organosilane moiety means a moiety having a silicon-carbon bond. An epoxy group means a three-membered ring moiety formed of carbon-carbon-oxygen.

The silane coupling agent (b1) may be a compound represented by formula (1):

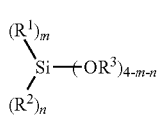

(1)

wherein $R^1$ is a $C_{1-20}$ monovalent hydrocarbon group having an epoxy group or a substituent having an epoxy group, $R^2$ is an alkyl group, an aryl group, an aralkyl group, or an acyl group, $R^3$ is an alkyl group, an aryl group, an aralkyl group, or an acyl group, m is an integer of 1 to 4, and n is an integer of 0 to 3, with the proviso that (m+n) is an integer of 3 or less.

Examples of functional groups in $R^2$ include an epoxy group and a glycidyloxy group.

The number of carbon atoms in the hydrocarbon group represented by $R^1$ may be 2 or more, and 3 or more, and may be 15 or less, 12 or less, and 10 or less. Incidentally, the number of carbon atoms means the total number of carbons in the hydrocarbon group including a substituent.

Examples of $R^1$ include a γ-glycidoxymethyl group, a γ-glycidoxyethyl group, a γ-glycidoxypropyl group, a β-epoxycyclohexylmethyl group, a β-epoxycyclohexylethyl group, and a β-epoxycyclohexylpropyl group.

Alkyl groups represented by $R^2$ and $R^3$ may be $C_{1-8}$ linear, branched, or cyclic alkyl groups.

Examples of alkyl groups represented by $R^2$ and $R^3$ include a methyl group, an ethyl group, an n-propyl group, i-propyl group, an n-butyl group, an i-butyl group, a sec-butyl group, a tert-butyl group, a pentyl group, a hexyl group, a cyclopentyl group, and a cyclohexyl group.

Aryl groups represented by $R^2$ and $R^3$ may be $C_{6-10}$ aryl groups. Examples of such aryl groups include a phenyl group and a tolyl group.

Aralkyl groups represented by $R^2$ and $R^3$ may be $C_{7-10}$ aralkyl groups. Examples of such aralkyl groups include a benzyl group and a phenethyl group.

Acyl groups represented by $R^2$ and $R^3$ may be $C_{2-10}$ acyl groups. Examples of such acyl groups include an acetyl group.

Among them, $R^2$ and $R^3$ may be methyl groups or ethyl groups.

m may be an integer of 1 to 3, an integer of 1 or 2, and 1.

n may be an integer of 0 to 3, an integer of 0 or 1, and 0.

In the case where a plurality of R's are present in the compound of formula (1), the R's may be the same as or different from each other. The same also applies to $R^2$ and $R^3$.

Examples of silane coupling agents (b1) include 2-(3,4-epoxycyclohexyl)ethyltrimethoxysilane, 3-glycidoxypropylmethyldimetoxysilane, 3-glycidoxypropyltrimetoxysilane, 3-glycidoxypropylmethyldiethoxysilane, 3-glycidoxypropyltriethoxysilane, and 3-ethyl-3-{[3-(triethoxysilyl)propoxy]methyl}oxetane. Among them, 3-glycidoxypropyltrimetoxysilane is preferable.

In terms of improving scratch resistance, the content of the silane coupling agent (b1) relative to the solids content of the entire coating composition may be 5 mass % or more, 10 mass % or more, 15 mass % or more, and 20 mass % or more, and may be 60 mass % or less, 50 mass % or less, 40 mass % or less, and 30 mass % or less.

Together with the silane coupling agent (b1), a silane coupling agent (b1') containing at least one member selected from a vinyl group, a methacrylic group, and an acrylic group may be used.

Examples of silane coupling agents (b1') include vinyltrimethoxysilane, vinyltriethoxysilane, 3-methacryloxypropylmethyldimethoxysilane, 3-methacryloxypropyltrimethoxysilane, 3-methacryloxypropylmethyldiethoxysilane, and 3-methacryloxypropyltriethoxysilane.

The content of the silane coupling agent (b1') relative to the solids content of the entire coating composition may be 1 mass % or more, 3 mass % or more, and 5 mass % or more, and may be 50 mass % or less, 30 mass % or less, and 20 mass % or less.

<Polyglycerol Polyglycidyl Ether (b2)>

In terms of obtaining excellent scratch resistance and also in terms of tackiness suppression, the coating composition contains a polyglycerol polyglycidyl ether (b2) having three or more epoxy groups. Among polyfunctional epoxy compounds, when the polyglycerol polyglycidyl ether (b2) is selected, an excellent scratch resistance effect and a tackiness suppression effect are obtained.

In terms of further improving scratch resistance and further suppressing tackiness, the polyglycerol polyglycidyl ether (b2) has four or more epoxy groups.

In terms of further improving scratch resistance and further suppressing tackiness, the epoxy equivalent of the polyglycerol polyglycidyl ether (b2) may be 150 g/eq or more, 160 g/eq or more, 170 g/eq or more, and 180 g/eq or more, and may be 250 g/eq or less, 220 g/eq or less, and 200 g/eq or less.

The measurement method for an epoxy equivalent is based on the method defined in JIS K7236:2001.

In terms of further improving scratch resistance and further suppressing tackiness, the viscosity of the polyglycerol polyglycidyl ether(b2) may be 1,000 mPa·s or more, 2,000 mPa·s or more, 3,000 mPa·s or more, and 4,000 mPa·s or more, and may be 8,000 mPa·s or less, 7,000 mPa·s or less, 6,000 mPa·s or less, and 5,000 mPa·s or less.

The viscosity is a value measured using an E-type viscometer at 25° C.

The content of the polyglycerol polyglycidyl ether (b2) relative to the solids content of the entire coating composition may be 10 mass % or more, 15 mass % or more, and 20 mass % or more, and may be 50 mass % or less, 40 mass % or less, and 30 mass % or less.

<Additional Polyfunctional Epoxy Compound (b3)>

The coating composition may also contain an additional polyfunctional epoxy compound (b3) different from the above polyglycerol polyglycidyl ether (b2).

Examples of polyfunctional epoxy compounds (b3) include sorbitol polyglycidyl ether, pentaerythritol polyglycidyl ether, trimethylolpropane polyglycidyl ether, resorcinol diglycidyl ether, neopentyl glycol diglycidyl ether, 1,6-hexanediol diglycidyl ether, hydrogenated bisphenol A diglycidyl ether, ethylene-polyethylene glycol diglycidyl ether, propylene-polypropylene glycol diglycidyl ether, allyl glycidyl ether, 2-ethylhexyl glycidyl ether, phenyl glycidyl ether, phenol polyethylene oxide adduct glycidyl ether, p-tert-butylphenyl glycidyl ether, lauryl alcohol polyethylene oxide adduct glycidyl ether, andpolybutadiene diglycidyl ether.

The content of the additional polyfunctional epoxy compound (b3) relative to the solids content of the entire coating composition may be 1 mass % or more, 3 mass % or more, and 5 mass % or more, and may be 30 mass % or less, 20 mass % or less, and 10 mass % or less.

<Photocationic Polymerization Initiator (C)>

A photocationic polymerization initiator (C) is a compound that generates a cation or a Lewis acid upon irradiation with UV rays, electron rays, or like active energy rays and initiates the polymerization of a monomer such as an epoxy compound or an oxetane compound.

In order to minimize the influence of light irradiation on a lens substrate, the photocationic polymerization initiator (C) may be a compound that generates a cation or a Lewis acid upon irradiation with UV light having a wavelength 400 to 315 nm.

Examples of photocationic polymerization initiators (C) include a sulfonium salt, an iodonium salt, and a diazonium salt.

Examples of sulfonium salts include triarylsulfonium salts such as triphenylsulfonium hexafluorophosphate, triphenylsulfonium hexafluoroantimonate, triphenylsulfonium tetrakis(pentafluorophenyl)borate, diphenyl-4-(phenylthio)phenylsulfonium hexafluorophosphate, diphenyl-4-(phenylthio)phenylsulfonium hexafluoroantimonate, 4,4'-bis[diphenylsulfonio]diphenylsulfide bishexafluorophosphate, 4,4'-bis[di(β-hydroxyethoxy)phenylsulfonio]diphenylsulfide bishexafluoroantimonate, 4,4'-bis[di(β-hydroxyethoxy)phenylsulfonio]diphenylsulfide bishexafluorophosphate, 7-[di(β-toluyl)sulfonio]-2-isopropylthioxanthone hexafluoroantimonate, 7-[di(β-toluyl)sulfonio]-2-isopropylthioxanthone tetrakis(pentafluorophenyl)borate, 4-phenylcarbonyl-4'-diphenylsulfonio diphenylsulfide hexafluorophosphate, 4-(p-tert-butylphenylcarbonyl)-4'-diphenylsulfonio diphenylsulfide hexafluoroantimonate, and 4-(p-tert-butylphenylcarbonyl)-4'-di(p-toluyl)sulfonio-diph enylsulfide tetrakis(pentafluorophenyl)borate.

Examples of iodonium salts include diaryliodonium salts such as diphenyliodonium tetrakis(pentafluorophenyl)borate, diphenyliodonium hexafluorophosphate, diphenyliodonium hexafluoroantimonate, di(4-t-butylphenyl)iodonium hexafluorophosphate, di(4-t-butylphenyl)iodonium hexafluoroantimonate, tolylcumyl iodonium tetrakis(pentafluorophenyl)borate, (4-methylphenyl)[4-(2-methylpropyl)phenyl]-hexafluorophosph ate, di(4-nonylphenyl)iodonium hexafluorophosphate, and di(4-alkylphenyl)iodonium hexafluorophosphate.

Examples of diazonium salts include benzenediazonium hexafluoroantimonate and benzenediazonium hexafluorophosphate.

Examples of commercially available products of photocationic polymerization initiators (C) include ADEKA OPTOMERSP-100, SP-150, SP-152, SP-170, and SP-172 manufactured by ADEKA Corporation; Photoinitiator 2074 manufactured by Rhodia; KAYARADPCI-220 and PCI-620 manufactured by Nippon Kayaku Co., Ltd.; IRGACURE 250 manufactured by Ciba JapanK. K.; CPI-100P, CPI-110P, CPI-101A, CPI-200K, and CPI-210S manufactured by San-Apro Ltd.; WPI-113 and WPI-116 manufactured by Wako Pure Chemical Industries, Ltd.; and BBI-102, BBI-103, TPS-102, TPS-103, DTS-102, and DTS-103 manufactured by Midori Kagaku Co., Ltd.

Among them, the photocationic polymerization initiator may be a sulfonium salt, and diphenyl-4-(phenylthio)phenylsulfonium hexafluorophosphate or diphenyl-4-(phenylthio)phenylsulfonium hexafluoroantimonate.

The content of the photocationic polymerization initiator (C) relative to the total amount of the silane coupling agent (b1), the polyglycerol polyglycidyl ether (b2), and the additional polyfunctional epoxy compound (b3) may be 0.1 mass % or more, 0.5 mass % or more, and 1 mass % or more, and may be 10 mass % or less, 8 mass % or less, and 7 mass % or less.

<Leveling Agent>

In order to improve the wettability at the time of application to form a uniform film, a leveling agent may be added to the coating composition. Various leveling agents can be used as the leveling agent. However, among them, it is preferable to use a polyoxyalkylene-dimethylpolysiloxane copolymer (e.g., trade name "Y-7006" manufactured by Dow Corning Toray Co., Ltd.). The amount of leveling agent blended in the coating composition can be adjusted according to the viscosity, wettability, and the like of the composition, and may be 0.01 to 1 mass %, for example. In addition, the amount of leveling agent blended in the coating composition may be 0.02 to 2 mass %, for example, relative to the solids content of the entire coating composition.

In order to form a uniform film, the coating composition may also contain an organic solvent.

The organic solvent may be at least one member selected from ether solvents, ester solvents, acetal solvents, and nonpolar solvents. Specific examples thereof include propylene glycol methyl ether (hereinafter sometimes referred to as "PGM") methyl ethyl ketone, and ethylene glycol mono-n-propyl ether.

In the coating composition, in addition to the above components, known additives such as UV absorbers, IR absorbers, light stabilizers, antioxidants, dyes, pigments, photochromic agents, and antistatic agents may also be blended.

The solids content in the coating composition relative to the entire composition may be 10 mass % or more, 20 mass % or more, and 30 mass % or more, and may be 70 mass % or less, 60 mass % or less, and 55 mass % or less.

The filler/matrix mass ratio (hereinafter sometimes simply referred to as "F/M") in the coating composition may be 0.4 to 1.8, 0.6 to 1.4, and 0.6 to 1.2.

Incidentally, a filler/matrix mass ratio means the mass ratio between the total amount of the inorganic oxide particles (A) and the total amount of the silane coupling agent (b1), the polyglycerol polyglycidyl ether (b2), and the additional polyfunctional epoxy compound (b3).

The coating composition is obtained by mixing the above components. A method for producing the coating composition includes, for example, a step in which the inorganic oxide particles (A), the silane coupling agent (b1), and the polyglycerol polyglycidyl ether (b2), as well as the additional polyfunctional epoxy compound (b3), the organic solvent, and the photocationic polymerization initiator (C) as necessary, are added, stirred, and mixed The coating composition can be used for the formation of a hard coat layer of a spectacle lens.

[Method for Producing Spectacle Lens]

In terms of obtaining excellent scratch resistance, a method for producing a spectacle lens according to an embodiment includes a step of applying the above coating composition onto a substrate and a step of curing the applied coating composition by irradiation with light. Because the composition is cured by irradiation with light, a cured film can be formed within a short period of time.

As the substrate, although glass is also usable, plastics such as synthetic resin substrates are particularly suitable.

Examples of plastics for a substrate include methyl methacrylate, a copolymer of methyl methacrylate and at least one other monomer, diethylene glycol bisallyl carbonate, a copolymer of diethylene glycol bisallyl carbonate with at least one other monomer, polycarbonate, polystyrene, polyvinyl chloride, unsaturated polyester, polyethylene terephthalate, polyurethane, polythiourethane, sulfide resins utilizing an ene-thiol reaction, and sulfur-containing vinyl polymers.

As a method for applying the coating composition onto a substrate, a dipping method, a spin method, a spray method, and the like are applied as usual methods. However, in terms of surface accuracy, a dipping method and a spin method are preferable.

Incidentally, prior to the application of the coating material onto a substrate, it is also possible to perform a chemical treatment with an acid, an alkali, or various organic solvents, a physical treatment with plasma, UV rays, or the like, or a cleaning treatment with various detergents.

The coating composition can be irradiated with light and cured, thereby forming a hard coat layer.

As the light source of light, known light sources can be used without any limitations. Specific examples thereof include an ultrahigh-pressure mercury lamp, a high-pressure mercury lamp, a low-pressure mercury lamp, a xenon lamp, a carbon arc, a germicidal lamp, and an electrodeless lamp.

As light, UV rays are preferable. The wavelength of UV rays may be 315 to 400 nm.

The method for producing a spectacle lens may further include, after the step of curing, a step of heating at 50 to 200° C.

The heating temperature may be 60 to 180° C., 70 to 150° C., and 80 to 130° C.

The heating time may be 30 minutes to 3 hours, 40 minutes to 2 hours, and 45 minutes to 1.5 hours.

The thickness of the hard coat layer may be 0.5 to 50 μm, 0.5 to 20 μm, and 1 to 5 μm.

In the above producing method, it is also possible to further form an interference fringe reduction layer. The interference fringe reduction layer is provided in order to suppress the formation of interference fringes on the surface of a spectacle lens.

In terms of more significantly preventing the formation of interference fringes, the interference fringe reduction layer may satisfie the following conditions 1 and 2.

<Condition 1> The refractive index $n_p$ of the interference fringe reduction layer satisfies the following formula (I).

$$(n_s \cdot n_H)^{1/2} + |n_s - n_H|/4 \geq n_p \geq (n_s \cdot n_H)^{1/2} - |n_s - n_H|/4 \qquad (I)$$

($n_s$ is the refractive index of a plastic substrate, and $n_H$ is the refractive index of a hard coat layer)

<Condition 2> The film thickness d of the interference fringe reduction layer satisfies the following formula (II).

$$d = \lambda/(4n_p) \qquad (II)$$

($\lambda$ is the wavelength of visible light, 450 to 650 nm)

An interference fringe reduction layer can be obtained by the same method as for the formation of a coat layer described above.

In order to suppress interference fringes, the physical film thickness of the interference fringe reduction layer may be 50 to 100 nm, and 60 to 95 nm.

In the above method, it is also possible to further form an antireflection coating on the hard coat layer.

The configuration of the antireflection coating is not particularly limited, and a conventionally known monolayer or multilayer film made of an inorganic oxide can be used.

As a multilayer film, for example, the configuration may be such that a $SiO_2$ film and a $ZrO_2$ film are alternately laminated to make $\lambda/4$-$\lambda/2$-$\lambda/4$ relative to the wavelength lambda of incident light.

The hard coat layer formed by applying and curing the coating composition has excellent scratch resistance and adhesion to substrates.

[Spectacle Lens]

In order to obtain excellent scratch resistance, the spectacle lens according to an embodiment may include a hard coat layer, which is obtained by curing the coating composition according to the above embodiment, and a substrate, and may include a hard coat layer, which is obtained by curing the coating composition of the present disclosure, and also, on the hard coat layer, an antireflection coating and a substrate.

EXAMPLES

Hereinafter, specific examples will be shown, but the claims of the disclosure are not limited to the following examples.

In the Examples, an affinity test was performed through the following procedures.

[Affinity Test]

A sol containing inorganic oxide particles and a dipentaerythritol acrylate compound R-1 represented by the following formula (trade name "KATARAD DPCA-30" manufactured by Nippon Kayaku Co., Ltd.) are mixed in a F/M of 0.8. The obtained sample is set in a 10 mm×10 mm cell, and the light transmittance at a wavelength of 660 nm is measured in accordance with JIS K 0101.

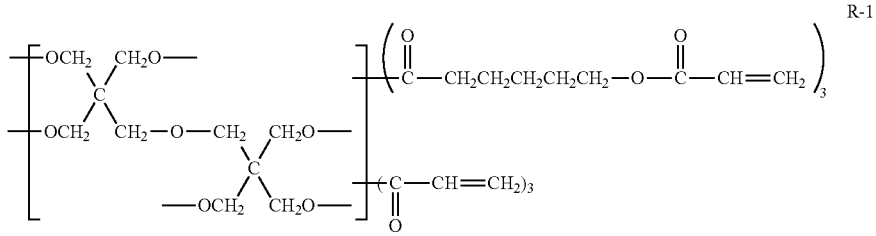

Incidentally, this light transmittance should be measured under room temperature conditions within 24 hours after the preparation of the sample. The measurement results are shown in the table.

Example 1

(Preparation of Coating Composition)

To a glass vessel equipped with a magnetic stirrer, as inorganic oxide particles (A), 29.63 g of a silica sol (trade name "PGM-ST", manufactured by Nissan Chemical Corporation, solids content: 30 mass %, average particle size: 13 nm) was added. Further, as a silane coupling agent (B), 5.56 g of γ-glycidoxypropyltrimethoxysilane (trade name "KBM403", manufactured by Shin-Etsu Chemical Co., Ltd.) was added dropwise with stirring.

After the completion of dropwise addition, as a polyfunctional epoxy compound (b2), 5.56 g of polyglycerol polyglycidyl ether (trade name "EX-521", manufactured by Nagase ChemteX Corporation, tetra- or higher functional, epoxy equivalent: 183 g/eq, viscosity: 4,400 mPa·s) was added and thoroughly stirred.

Subsequently, 9.26 g of propylene glycol methyl ether (hereinafter sometimes simply referred to as "PGM") as a solvent, further 0.03 g (as solids) of a leveling agent (trade name "Y-7006", polyoxyalkylene-dimethylpolysiloxane copolymer, manufactured by Dow Corning Toray Co., Ltd., 10 mass % PCM solution), and 0.67 g (as solids) of a photocationic polymerization initiator (C) (trade name "CPI-100P", San-Apro Ltd., solids content: 50 mass %) were added, thoroughly stirred, and then filtered, thereby giving a coating composition.

(Application and Curing)

As a substrate of a plastic lens, diethylene glycol bisallyl carbonate (manufactured by HOYA Corporation, trade name: HL, refractive index: 1.50, dioptric power: −4.00, center thickness: 2.0 mm) was used. The substrate was dipping-treated in a 10 mass % aqueous sodium hydroxide solution at 45° C. for 5 minutes and thoroughly dried.

Subsequently, the coating composition prepared by the above method was applied by a spin method (rotation speed: 1,000 rpm).

Further, irradiation with UV rays was performed for 30 seconds to cure the coating composition, thereby forming a transparent hard coat layer. The evaluation results are shown in Table 1.

Comparative Examples 1 to 4

Coating compositions of Comparative Examples 1 to 4 were obtained under the same conditions as in Example 1, except that the coating compositions shown in Table 1 were used. The evaluation results are shown in Table 1.

The materials shown in the table are as follows.

[Inorganic Oxide (A)]

PGM-ST: Hydrophilic silica sol (trade name "PGM-ST", manufactured Nissan Chemical Corporation, solids content: 30 mass %, average particle size: 13 nm)

[Silane Coupling Agent (b1)]

KBM403: γ-Glycidoxypropyltrimethoxysilane (trade name "KBM403", manufactured by Shin-Etsu Chemical Co., Ltd.) [Polyfunctional Epoxy Compound (b2)]

EX-521: Polyglycerol polyglycidyl ether (trade name "EX-521", manufactured by Nagase ChemteX Corporation, tetra- or higher functional, epoxy equivalent: 183 g/eq, viscosity: 4,400 mPa·s)

EX-321: Trimethylolpropane polyglycidyl ether (trade name "EX-321", manufactured by Nagase ChemteX Corporation, di- or trifunctional, epoxy equivalent: 140 g/eq, viscosity: 130 mPa·s)

EX-411: Pentaerythritol polyglycidyl ether (trade name "EX-411", manufactured by Nagase ChemteX Corporation, tri- or tetrafunctional, epoxy equivalent: 140 g/eq, viscosity: 130 mPa·s)

DOX: Di[1-ethyl(3-oxetanyl)]methyl ether (difunctional oxetane compound)

[Cationic Initiator (C)]

CPI-100P: Diphenyl-4-(phenylthio)phenylsulfonium hexafluorophosphate (trade name "CPI-100P", San-Apro Ltd., solids content: 50 mass %)

[Leveling Agent]

Y-7006: Polyoxyalkylene-dimethylpolysiloxane copolymer (trade name "Y-7006", manufactured by Dow Corning Toray Co., Ltd., 10 mass % PGM solution)

The evaluation methods were as follows.

[SW Film Scratch Resistance Evaluation]

The surface was subjected to 10 double rubs under a load of 2 kg using Steel Wool #0000 (manufactured by Nihon Steel Wool Co., Ltd.), and the resistance to scratches was visually judged. The criteria were as follows.
5: Almost no scratches are formed
4: 1 to 10 scratches are formed
3: 10 to 30 scratches are formed
2: Surface is clouded
1: Hard coat layer is peeled off

[Tackiness Test]

The surface of the formed hard coat layer was touched with a finger to check the adhesiveness. The surface was adhesive, "present" was given, while when not adhesive, "absent" was given.

TABLE 1

|  |  | Example 1 | Comparative Example 1 | Comparative Example 2 | Comparative Example 3 | Comparative Example 4 |
|---|---|---|---|---|---|---|
|  | Process | UV | UV | UV | UV | UV |
| Inorganic oxide (A) | Product name | PGM-ST | PGM-ST | PGM-ST | PGM-ST | PGM-ST |
|  | Kind | $SiO_2$ | $SiO_2$ | $SiO_2$ | $SiO_2$ | $SiO_2$ |
|  | Affinity test (%) | 22 | 22 | 22 | 22 | 22 |
|  | Total amount including solvent (g) | 29.63 | 29.63 | 29.63 | 29.63 | 29.63 |
|  | Solids content thereof (g) | 8.89 | 8.89 | 8.89 | 8.89 | 8.89 |
| Silane coupling agent (b1) | Kind | KBM403 | KBM403 | KBM403 | KBM403 | KBM403 |
|  | Amount (g) | 5.56 | 11.11 | 5.56 | 5.56 | 5.56 |
| Polyfunctional epoxy compound (b2) | Kind | EX521 | — | EX321 | EX411 | DOX |
|  | Amount (g) | 5.56 | 0.00 | 5.56 | 5.56 | 5.56 |
| Solvent | Kind | PGM | PGM | PGM | PGM | PGM |
|  | Amount (g) | 9.26 | 9.26 | 9.26 | 9.26 | 9.26 |
| Cationic initiator (C) | Kind | CPI-100P | CPI-100P | CPI-100P | CPI-100P | CPI-100P |
|  | Amount (g) | 0.667 | 0.667 | 0.667 | 0.667 | 0.667 |
| Leveling Agent | Kind | Y-7006 | Y-7006 | Y-7006 | Y-7006 | Y-7006 |
|  | Total amount including solvent (g) | 0.300 | 0.300 | 0.300 | 0.300 | 0.300 |
|  | Solids content thereof (g) | 0.030 | 0.030 | 0.030 | 0.030 | 0.030 |
|  | F/M | 0.8 | 0.8 | 0.8 | 0.8 | 0.8 |
|  | Thickness (μm) | 2.5 | 2.5 | 2.5 | 2.5 | 2.5 |
| Evaluation | SW film scratch resistance evaluation | 5 | 1 | 1 | 1 | 1 |
|  | Tackiness | Absent | Absent | Absent | Present | Present |

From a comparison between Example 1 and Comparative Examples 1 to 4, it can be seen that the coating composition of the present disclosure shows excellent scratch resistance and a tackiness suppression effect.

Finally, embodiments of the present disclosure will be summarized.

One embodiment of the present disclosure relates to a coating composition containing: inorganic oxide particles (A); a silane coupling agent (b1) having an organosilane moiety and an epoxy group; a polyglycerol polyglycidyl ether (b2) having three or more epoxy groups; and a photocationic polymerization initiator (C).

According to the coating composition according to one embodiment described above, a hard coat layer having excellent scratch resistance can be formed.

Further, according to the coating composition according to one embodiment described above, tackiness can be suppressed.

One embodiment of the present disclosure relates to a spectacle lens including a hard coat layer obtainable by curing the coating composition according to one embodiment described above and a substrate.

According to the spectacle lens according to one embodiment described above, the scratch resistance is excellent. Further, according to the spectacle lens according to one embodiment described above, tackiness can be suppressed.

One embodiment of the present disclosure relates to a method for producing a spectacle lens, including:

a step of applying the coating composition according to one embodiment described above onto a substrate; and a step of curing the applied coating composition by irradiation with UV rays.

According to one example described above, a cured film can be formed within a short period of time, and a hard coat layer having excellent scratch resistance can be formed.

It should be understood that the embodiments disclosed herein are illustrative and not limitative in any respect. The scope of the present disclosure is indicated by the claims rather than by the foregoing description, and is intended to encompass all changes which come within the meaning and range of equivalency of the claims.

The invention claimed is:

1. A spectacle lens comprising:
 a hard coat layer obtainable by curing a coating composition comprising:
  inorganic oxide particles (A),
  a silane coupling agent (b1) having an organosilane moiety and an epoxy group,
  a polyglycerol polyglycidyl ether (b2) consisting of polyglycerol polyglycidyl ether having four or more epoxy groups, a content of the polyglycerol polyglycidyl ether (b2) relative to a solids content of the coating composition is in a range of 10 mass % or more and 50 mass % or less, and
  a photocationic polymerization initiator (C); and
 a substrate.

2. The spectacle lens according to claim 1, wherein the polyglycerol polyglycidyl ether (b2) has an epoxy equivalent of 150 g/eq or more.

3. The spectacle lens according to claim 1, wherein the polyglycerol polyglycidyl ether (b2) has a viscosity of 1,000 mPa·s or more and 8,000 mPa·s or less.

4. The spectacle lens according to claim 1, wherein the inorganic oxide particles (A) are at least one kind selected from silica particles and zirconia particles.

5. The spectacle lens according to claim 1, wherein the inorganic oxide particles (A) have a light transmittance of 50% or less at a wavelength of 660 nm in an affinity test for a dipentaerythritol acrylate compound.

6. A method for producing a spectacle lens, comprising:
a step of applying a coating composition onto a substrate, the coating composition comprising:
inorganic oxide particles (A),
a silane coupling agent (b1) having an organosilane moiety and an epoxy group,
a polyglycerol polyglycidyl ether (b2) consisting of polyglycerol polyglycidyl ether having four or more epoxy groups, a content of the polyglycerol polyglycidyl ether (b2) relative to a solids content of the coating composition is in a range of 10 mass % or more and 50 mass % or less, and
a photocationic polymerization initiator (C); and
a step of curing the applied coating composition by irradiation with light.

\* \* \* \* \*